United States Patent [19]

Kobayashi et al.

[11] Patent Number: 5,213,893
[45] Date of Patent: May 25, 1993

[54] WATERPROOFING AGENT FOR CABLE

[75] Inventors: Hiroya Kobayashi; Kazuhiro Okamura, both of Osaka; Yoshiyuki Takahashi, Kyoto; Tadao Shimomura, Osaka, all of Japan

[73] Assignee: Nippon Shokubai Co., Ltd., Osaka, Japan

[21] Appl. No.: 757,703

[22] Filed: Sep. 11, 1991

[30] Foreign Application Priority Data

Sep. 14, 1990 [JP] Japan .................................. 2-245424
Dec. 27, 1990 [JP] Japan .................................. 2-408086
Jan. 21, 1991 [JP] Japan .................................. 2-5126

[51] Int. Cl.$^5$ ..................... B32B 5/16; C08F 226/02
[52] U.S. Cl. ................................ 428/402; 526/307.6; 526/240
[58] Field of Search ................. 526/307.6, 240; 428/402

[56] References Cited

U.S. PATENT DOCUMENTS

| | | | |
|---|---|---|---|
| 3,711,574 | 1/1973 | Jaworek et al. | 526/307.6 |
| 4,002,819 | 1/1977 | Woytiuk . | |
| 4,070,348 | 1/1978 | Kräemer et al. | 526/307.6 |
| 4,533,708 | 8/1985 | Costello | 526/307.6 |
| 4,625,009 | 11/1986 | Izumitani et al. | 526/307.6 |
| 4,711,944 | 12/1987 | Sherwin et al. | 526/307.6 |
| 4,722,958 | 2/1988 | Sauer et al. | 526/307.6 |
| 4,789,713 | 12/1988 | Sanner et al. | 526/307.6 |
| 4,925,908 | 5/1990 | Bernard et al. | 526/307.6 |
| 4,980,434 | 12/1990 | Farrar et al. | 526/307.6 |
| 4,988,568 | 1/1991 | Hasegawa et al. | 526/307.6 |

FOREIGN PATENT DOCUMENTS

| | | | |
|---|---|---|---|
| 0316457 | 5/1989 | European Pat. Off. . | |
| 3444087 | 7/1985 | Fed. Rep. of Germany | 526/307.6 |
| 58-95545 | 6/1983 | Japan | 526/307.6 |
| 59-15417 | 1/1984 | Japan | 526/307.6 |
| 61-129228 | 8/1986 | Japan . | |
| 62-89714 | 4/1987 | Japan | 526/307.6 |
| 1154290 | 5/1985 | U.S.S.R. | 526/307.6 |
| 1368670 | 10/1974 | United Kingdom | 526/307.6 |

OTHER PUBLICATIONS

Chem Abstract, "Chemistry of Synthetic High Polymer", V. 113, No. 6, (1990).
European Search Report 91308380.4.

Primary Examiner—Joseph L. Schofer
Assistant Examiner—N. Sarofim
Attorney, Agent, or Firm—Omri M. Behr; Matthew J. McDonald

[57] ABSTRACT

A cable grade water proofing agent made of a crosslinked polymer produced by polymerizing a monomer mixture comprising at least one (meth)acrylic compound selected from the group consisting of (meth)acrylic acids and (meth)acrylic salts and a (meth)acrylamide in a molar ratio of said (meth)acrylic compound to said (meth)acrylamide in the range of from 1:9 to 5:5, said cross-linked polymer exhibiting a speed of absorption of not more than 8 minutes as expressed by the time required for the absorption of artificial seawater to reach 90% of the maximum, a capacity for absorption of said artificial seawater of not less than 8 times the own weight, and a gel viscosity in the range of from $0.6 \times 10^5$ to $2.5 \times 10^5$ dynes·s/cm$^3$, and a composite waterproofing material carried on a substrate such as yarns and tape.

8 Claims, 1 Drawing Sheet

WATERPROOFING AGENT FOR CABLE

BACKGROUND OF THE INVENTION

1. Field of the Invention

This invention relates to a waterproofing agent for cable, a waterproofing tape, waterproofing yarns, an absorbent composition, and a waterproofing agent containing the composition. More particularly, it relates to a waterproofing agent which prevents water, particularly a highly concentrated saline water such as seawater, from entering the sheath of a varying cable such as are embracing communication grade cables like optical cables and metallic cables and electric cables, migrating within the sheath, and deteriorating the cable itself or various devices connected thereto, a waterproofing tape, waterproofing yarns, a absorbent composition, and a waterproofing agent containing the composition.

2. Description of the Prior Art

When the sheath of a cable sustains an external injury and suffers infiltration of water, the water rapidly migrates within the sheath and deteriorates the optical fiber or electric line of the cable or various devices connected thereto. A method for solving this problem by filling the sheath interior with a waterproofing agent, a waterproofing tape, or waterproofing yarns invariably made of absorbent resin or with an absorbent has been proposed.

The absorbent resins which have been heretofore used for this purpose include cross-linked polysodium acrylate, neutralized starch-acrylic acid graft copolymer, saponified vinyl acetate-acrylic ester copolymers, and neutralized cross-linked isobutylene-maleic anhydride copolymer, for example.

Since the absorbent resins mentioned above, when used in their independent form, absorb water slowly, they are made to absorb water quickly by a method such as the addition of an inorganic powder (JP-A-56-133,028(1981)). This method faces as a problem the fact that the slippage between gel particles is impaired by the added inorganic powder (because of excessive increase in the gel viscosity) and, depending on the construction of the cable, the absorbent resin suffers an eventual decline of its waterproofing ability because the gel is not allowed to migrate to the path of infiltration of water.

Further, the absorbent resins mentioned above face as a problem thereof the fact that since they are deficient in ability to absorb saline water, these absorbent resins used in cables fail to prevent infiltration of water when the cables are buried under ground or under sea bottom.

The waterproofing tapes heretofore used have been produced by having such absorbent resins as cross-linked polysodium acrylate, neutralized starch-acrylic acid graft polymer, saponified vinyl acetate-acrylic ester copolymers, and neutralized cross-linked isobutylene-maleic anhydride copolymer deposited fast on non-woven fabrics (JP-A-64-76,609(1989) and JP-U-61-129,228(1986)). The waterproofing tapes mentioned above, however, are problematic in that because the waterproofing tapes absorb water at unduly low speeds and exhibit no sufficient ability to absorb saline water and because the absorbent resins used therein have no appropriate gel viscosity, the waterproofing tapes used in cables buried under ground or under sea bottom allow no sufficient prevention of infiltration of water.

It has been proposed to produce an absorbent tape of an excellent ability to cut off seawater by impregnating a substrate such as non-woven fabric with a water-soluble polymer like a sulfoalkyl(meth)acrylate or acrylamide and a cross-linking agent and subsequently cross-linking the polymer deposited in the substrate (JP-A-2-11,690(1990)). The waterproofing tape which has the substrate and the absorbent resin integrated fast as described above, however, faces as a problem the fact that it absorbs water at a low speed and, therefore, possesses only poor ability to cut off water.

The waterproofing yarns currently in popular use are produced by having such absorbent resins as cross-linked polysodium acrylate, neutralized starch-acrylic acid graft polymer, saponified vinyl acetate-acrylic ester copolymers, and neutralized cross-linked isobutylene-maleic anhydride copolymers deposited fast on non-woven fabrics (JP-A-62-259,305(1987) and JP-A-63-241,806(1988)). The waterproofing yarns mentioned above, however, face as a problem the fact that these waterproofing yarns, when used in cables buried under ground or under sea bottom, are incapable of fully preventing infiltration of water because the waterproofing yarns absorb water at a low speed and exhibit no sufficient ability to absorb saline water and because the absorbent resins used therein have no appropriate gel viscosity.

An object of this invention, therefore, is to provide a novel waterproofing agent for use in cables, a waterproofing tape, waterproofing yarns, an absorbent composition, and a waterproofing agent containing the absorbent composition.

Another object of this invention is to provide a cable grade waterproofing agent possessing an outstanding salt-resisting property such as to retain the speed of water absorption and the ability of water absorption thereof intact on exposure even to highly concentrated saline water entering the sheath of a cable and to manifest the waterproofing ability stably for a long time, a waterproofing tape, waterproofing yarns, an absorbent composition, and a waterproofing agent containing the absorbent composition.

SUMMARY OF THE INVENTION

These objects are accomplished by a cable grade waterproofing agent made of a cross-linked polymer obtained by polymerizing a monomer mixture comprising at least one (meth)acrylic compound selected from the group consisting of (meth)acrylic acids and (meth)acrylic salts and a (meth)acrylamide in a molar ratio of the (meth)acrylic compound to the (meth)acrylamide in the range of from 1:9 to 5:5, the cross-linked polymer exhibiting a speed of water absorption of not more than 8 minutes as expressed by the time required for the absorption of artificial seawater to reach 90% of the maximum, a capacity for absorption of the artificial seawater of not less than 8 times the own weight, and a gel viscosity in the range of from $0.6 \times 10^5$ to $2.5 \times 10^5$ dyne·s/cm$^3$.

The objects are accomplished by an absorbent agent composition comprising (A) 100 parts by weight of a cross-linked polymer obtained by polymerizing a monomer mixture comprising at least one (meth)acrylic compound selected from the group consisting of (meth)acrylic acids and (meth)acrylic salts and a (meth)acrylamide in a molar ratio of the (meth)acrylic compound to the (meth)acrylamide in the range of from 1:9 to 5:5 and (B) 0.5 to 50 parts by weight of a cross-linked poly(meth)acrylic acid (or salt thereof) obtained by polymerizing a (meth)acrylic monomer comprising a (meth)acrylic acid and a (meth)acrylic salts in a molar ratio in the range of from 2:8 to 10:0.

The use of the waterproofing agent of this invnetion allows production of a cable such that the waterproofing agent, when seawater or groundwater infiltrates the sheath of the cable, absorbs this water and prevents it from migrating in the cable and, consequently, the cable retains stable waterproofing ability and outstanding durability intact for a long time.

The absorbent agent composition and the waterproofing agent of the present invention both manifest an outstanding waterproofing effect to salt-containing aqueous liquids such as seawater, groundwater, blood, urine, and cement water, exhibit a pH value in the neutral zone, retain the capacity of water absorption intact even at high temperatures, and excel in heatproofness. Since they accordingly retain the waterproofing effect intact for a long time and avoid injuring other materials held in direct contact therewith, they are suitable for use in retaining tapes for optical cables, absorbent waterproofing tapes for optical cables, waterproofing tapes for electric cables, waterproofing tapes for communication cables, waterproofing tapes for concrete products, sealing tapes for engineering works, sealing tapes for agricultural/horticultural works, and sealing tapes for medical treatments, for example.

EXPLANATION OF THE PREFERRED EMBODIMENT

The (meth)acrylic salts to be contained in the cross-linked polymer for use in the present invention have no particular restriction except for the requirement that it should suffer no noticeable decline in polymerizability and in absorbency after polymerization. The (meth)acrylic salts which are effectively usable for the purpose include metal salts such as sodium (meth)acrylate, potassium (meth)acrylate, calcium (meth)acrylate, and magnesium (meth)acrylate, ammonium (meth)acrylate, and organic amines of (meth)acrylic acids, for example.

The mixing ratio of the (meth)acrylic acid and the (meth)acrylic salt to be used in the (meth)acrylic compound of this invention has no particular restriction. In consideration of such factors as the ability of water absorption, however, the molar ratio of the (meth)acrylic acid to the (meth)acrylic salt is preferable to be in the range of from 5:5 to 0:10, preferably from 3:7 to 0:10.

The monomer mixture to be used in the present invention may additionally incorporate therein other monomer such as, for example, sodium salt of 2-sulfoethyl (meth)acrylate, sodium salt of 2-acrylamide-2-methylpropane sulfonic acid, aminoethyl (meth)acrylate, or hydroxyethyl (meth)acrylate and an inorganic substance in amounts not enough to impair the polymerizability of the monomer mixture or the waterproofing ability of the produced polymer.

For the purpose of obtaining the cross-linked polymer to be used in the present invention, the molar ratio of the (meth)acrylic compound to the (meth)acrylamide is in the range of from 1:9 to 5:5, preferably 2:8 to 4:6. If the molar ratio of the (meth)acrylic compound to the (meth)acrylamide is in the range of from 5:5 (exclusive of 5:5 itself) to 10:0, the cross-linked polymer to be produced is susceptible of the influence of a polyvalent metal salt and is incapable of retaining stable waterproofing ability intact for a long time. Conversely, if the molar ratio of the (meth)acrylic compound to the (meth)acrylamide is in the range of from 1:9 (exclusive of 1:9 itself) to 0:10, the produced cross-linked polymer suffers deficiency in absorbing capacity and gel viscosity and fails to retain stable waterproofing ability intact for a long time.

The cross-linked polymer to be used in the present invention is required to have a speed of water absorption which, as expressed by the time required for the absorption of artificial seawater to reach 90% of the maximum, is desired to be not more than 8 minutes, preferably to be in the range of from 0.5 to 6 minutes. If the time required for the equilibrium ratio of absorption of artificial seawater exceeds 8 minutes, the produced cross-linked polymer is deficient in waterproofing ability.

The cross-linked polymer to be used in the present invention is required to have a capacity for absorption of artificial seawater of not less than 8 times the own weight, desirably from 12 to 50 times, preferably from 14 to 30 times the own weight. If this capacity is less than 8 times the own weight, the cross-linked polymer encounters difficulty in retaining ample absorbing capacity intact for a long time.

The cross-linked polymer to be used in the present invention is required to have a gel viscosity in the range of from $0.6 \times 10^5$ to $2.5 \times 10^5$ dyne·s/cm$^3$, preferably from $1.0 \times 10^5$ to $1.8 \times 10^5$ dyne·s/cm$^3$. If the gel viscosity is less than $0.6 \times 10^5$ dyne·s/cm$^3$, the produced cross-linked polymer offers no sufficient resistance to the infiltrating water and encounters difficulty in retaining ample waterproofing ability intact for a long time. Conversely, if the gel viscosity exceeds $2.5 \times 10^5$ dyne·s/cm$^3$, the produced cross-linked polymer is deficient in waterproofing ability because the gel is deprived of slippage and consequently cannot migrate to the gap produced within the sheath and cease to produce a waterproofing effect.

The cross-linked polymer which is effectively used as the cable grade waterproofing agent of the present invention can be produced by preparing a gel or dry powder thereof by (1) a method which comprises polymerizing an unsaturated monomer mixture consisting of (meth)acrylic acid and/or a (meth)acrylic salt and a (meth)acrylamide, when necessary, in the presence of a cross-linking agent, (2) a method which comprises polymerizing a mixture of an unsaturated monomer consisting of (meth)acrylic acid and/or a (meth)acrylic salt and a (meth)acrylamide with other polymerizable monomer, when necessary, in the presence of a cross-linking agent, or (3) a method which comprises polymerizing an unsaturated monomer mixture comprising (meth)acrylic acid and/or a (meth)acrylic salt and a (meth)acrylamide thereby preparing a water-soluble polymer and then causing the water-soluble polymer to react with a cross-linking agent, and optionally adding to the gel or dry powder thereof a reducing agent such as a sulfite, for example, sodium hydrogen sulfite, and L-ascorbic acid.

The cross-linking agents which are effectively usable in the production of the cross-linked polymer of the present invention include compounds containing at least two ethylenically unsaturated groups per molecule such as divinyl benzene, ethylene glycol di(meth)acrylate, diethylene glycol di(meth)acrylate, triethylene glycol di(meth)acrylate, propylene glycol di(meth)acrylate, polyethylene glycol di(meth)acrylate, trimethylol propane tri(meth)acrylate, pentaerythritol tri(meth)acrylate, pentaerythritol di(meth)acrylate, N,N-methylene bis-acrylamide, triallyl isocyanurate, and trimethylol propane diallyl ether; polyhydric alcohols such as ethylene glycol, diethylene glycol, triethylene glycol, polyethylene glycol, glycerin, polyglycerin, propylene glycol, diethanol amine, triethanol amine, polypropylene glycol, polyvinyl alcohol, pentaerythritol, sorbitol, sorbitan, glucose, mannitol, mannitan, sucrose, and grape sugar; and polyepoxy compounds such as ethylene glycol diglycidyl ether, glycerol diglycidyl ether, polyethylene glycol diglycidyl ether, propylene glycol diglycidyl ether, polypropylene glycol diglycidyl ether, neo-pentyl glycol diglycidyl ether, 1,6-hexanediol diglycidyl ether, trimethylol propane diglycidyl ether, trimethylol propane triglycidyl ether, and glycerin triglydicyl ether, for example. These cross-linking agents may be used either independently or in the form of a mixture of two or more members. Among other cross-linking agents mentioned above, ethylene glycol di(meth)acrylate, trimethylol propane tri(meth)acrylate, N,N-methylene bis-acrylamide, and polyethylene glycol diglycidyl ether prove to be particularly preferable.

The produced polymer is desired to be heat-treated at a temperature in the range of from 150° to 250° C. when a polyhydric alcohol is used or at a temperature in the range of from 50° to 250° C. when a polyepoxy compound is used as a cross-linking agent. The use of the cross-linking agent in the polymerization is preferable because it allows free control of the cross-link density of the produced cross-linked polymer. The amount of the cross-linking agent to be used is in the range of from 0.00005 to 0.05 mol, preferably from 0.0005 to 0.005 mol, per mol of the aforementioned monomer mixture. If the amount of the cross-linking agent to be used exceeds 0.05 by molar ratio, the produced cross-linked polymer is liable to have an unduly large cross-link density, poor water-absorbing ability, and an unduly large gel viscosity. Conversely, if this amount is less than 0.00005, the produced cross-linked polymer possibly entails a problem of susceptibility to the impact of handling because this polymer is liable to have poor durability and a small cross-link density and acquire viscidity due to absorption of moisture.

For the production of the cross-linked polymer usable effectively as the cable grade waterproofing agent of the present invention, any of the methods for polymerization heretofore known to the art may be employed. A method which relies on the use of a radical polymerization catalyst and a method which resorts to exposure to a radiation, an electron beam, or an ultraviolet light may be cited, for example. Generally, the method which involves the use of a radical polymerization catalyst is employed.

The radical polymerization catalysts which are effectively usable herein are radical generating agents including peroxides such as hydrogen peroxide, benzoyl peroxide, and cumene hydroperoxide, azo compounds such as azo-bis-isobutylonitrile, and persulfates such as ammonium persulfate, sodium persulfate, and potassium persulfate and redox type initiators combining the radical generating agents with reducing agents such as sodium hydrogen sulfite, L-ascorbic acid, and ferrous salts, for example. The polymer solvents which are effectively usable herein include water, methanol, ethanol, isopropanol, acetone, dimethyl formamide, dimethyl sulfoxide, and mixtures thereof, for example. The amount of the polymerization initiator to be used is in the range of from 0.001 to 10% by weight, preferably 0.01 to 1% by weight, based on the amount of the monomer mixture. The amount of the reducing agent to be used is preferable to be in the range of from 0.01 to 5% by weight, preferably from 0.05 to 2% by weight based on the amount of the polymerization initiator.

Though the reaction temperature during the polymerization is variable with the kind of the catalyst to be used, it is desired to be relatively low because the produced cross-linked polymer acquires a large molecular weight at a relatively low temperature. For the purpose of ensuring completion of the polymerization, however, this temperature is desired to in the range of from 20° to 100° C.

The monomer concentration in the polymerization system has no particular restriction. In consideration of the ease of control of the reaction of polymerization and the yield and economy of the polymerization, however, this monomer concentration is desired to be in the range of from 20 to 80% by weight, preferably from 30 to 50% by weight. The polymerization contemplated herein can be effected in various forms. Among other methods available, suspension polymerization, cast polymerization, and a method which comprises polymerizing a gel-like hydrated polymer while finely dividing the polymer by virtue of the shear force (JP-A-57-34,101(1982)) prove to be particularly preferable.

For the purpose of improving the polymer in such properties as the capacity of water absorption, the speed of water absorption, and the gel viscosity which are indispensable to the operation of waterproofing to balanced levels, the hydrated gel-like polymer obtained by polymerizing the monomer mixture or the dry powder thereof is desired to be treated with a reducing agent added in advance thereto. The reducing agents which are effectively usable for this treatment include sodium sulfite, potassium sulfite, potassium hydrogen sulfite, sodium thiosulfate, ammonium thiosulfate, potassium thiosulfate, ammonium sulfite, ammonium hydrogen sulfite, sodium hydrogen sulfite, L-ascorbic acid, ammonia, monoethanol amine, and glucose, for example. The method which resorts to incorporation of sodium sulfite, sodium hydrogen sulfite, or sodium thiosulfate proves to be particularly desirable. The amount of the reducing agent to be added is desired to be in the range of from 0.0001 to 0.02 mol, preferably from 0.001 to 0.01 mol, per mol of the total monomer mixture.

When the cross-linked polymer to be used in the present invention is produced by performing the polymerization in accordance with the method described above, the monomer mixture may have a foaming agent and an inorganic substance incorporated therein in advance of the polymerization. Their incorporation is effective in enabling the produced cross-linked polymer to acquire an improvement in the speed of water absorption and consequently enabling the waterproofing agent produced from the polymer to manifest an improvement in the initial waterproofing ability.

The waterproofing agent to be used in the present invention may be obtained by preparing the cross-linked polymer as by the method of polymerization described above, then optionally drying the polymer, and finely pulverizing the dried polymer as by grinding into particles of a desired shape. The average diameter of these particles is in the range of from 5 to 500 μm, preferably from 10 to 300 μm. When the produced polymer is to be dried, the drying temperature is in the range of from 50° C. to 180° C., preferably from 100° to 170° C.

The waterproofing agent of the present invention may be used either alone or in combination with asbestos, pulp, synthetic fibers, or natural fibers in filling the empty space within the sheath of a cable.

The composite produced by depositing the waterproofing material of the present invention on a substrate such as of fibers, rubber, plastics, or non-woven fabric can be used as a waterproofing agent of special form which allows the packing work to be performed efficiently and produces a high waterproofing effect. The amount of the waterproofing agent to be used in the composite is in the range of from 1 to 5000 parts by weight, preferably from 5 to 500 parts by weight, based on 100 parts by weight of the substrate. The following methods (1) to (4), for example, are available for the production of the composite.

(1) A fibrous waterproofing material is obtained by adding the waterproofing agent to the spinning solution of synthetic fibers or fixing the waterproofing agent to a fibrous substance as of natural fibers with the aid of a viscous substance. The fibrous waterproofing agent may be used in its unmodified form to fill up the sheath interior or it may be processed in the form of fabric and then used to fill the sheath interior.

(2) A waterproofing material such as waterproofing sheet or tape is obtained by kneading a waterproofing agent with rubber or plastic and molding the resultant mixture with a roll or an extruding device.

(3) A waterproofing material such as waterproofing sheet or tape is obtained by fixing the waterproofing agent on a sheet or tape of non-woven fabric or paper with the aid of a binder or interposing the waterproofing agent between opposed sheets or tapes of non-woven fabric or paper.

(4) A waterproofing material such as waterproofing sheet or tape is obtained by applying the waterproofing agent mixed with a binder or a coating material as to a plastic film and then optionally cutting the coated film suitably.

Now, the waterproofing tape and the waterproofing yarns which are composite waterproofing articles will be described in detail below.

The waterproofing tape according with the present invention is produced by fixing the particles of the aforementioned cross-linked polymer on either or both of the surfaces of a substrate and/or in the caves of the substrate.

The cross-linked polymer particles to be used in the waterproofing tape and the waterproofing yarns are desired to have an average particle diameter in the range of from 5 to 250 μm, preferably from 10 to 100 μm. If the average particle diameter is less than 5 μm, the produced waterproofing tape possibly suffers from deficiency in waterproofing effect. If this diameter exceeds 250 μm, the produced waterproofing tape or waterproofing yarns grow so much in thickness as to fail to enter the fine gap in the cable.

The waterproofing tape of the present invention is obtained by fixing the cross-linked polymer particles obtained as described above on a substrate. In this case, the cross-linked polymer particles may be fixed in a dry state on the substrate or in a wet state on the substrate.

Various methods are available for the production of the waterproofing tape by the fixation of the cross-linked polymer particles on the substrate. The following methods, for example, may be adopted therefor.

(1) A method which comprises preparing a mixture for fixation by blending the cross-linked polymer particles with an organic polymer type binder, inorganic or organic minute particles, a fibrous substance, a surfactant, or a solvent, either applying the mixture to either or both of the surfaces of a substrate of the form of a sheet or tape of non-woven fabric, woven fabric, paper, or film or impregnating the substrate with the mixture, and drying the coated or impregnated substrate when the solvent has been used or heat-treating it when the thermosetting binder or heatsealing binder has been used.

(2) A method which comprises interposing the aforementioned mixture for fixation between at least two opposed sheets or tapes of substrate of non-woven fabric, woven fabric, paper, or film and then either drying the resultant sandwich composite when the solvent has been used or heat-treating it when the thermosetting binder or heatsealing binder has been used.

The production of the waterproofing tape of the present invention does not always require to use a binder. The fixation of the cross-linked polymer particles on the substrate can be effected by dispersing the cross-linked polymer particles in an organic solvent and then simply impregnating the substrate of the form of a sheet of non-woven fabric, woven fabric, paper, film, synthetic fibers, or natural fibers with the resultant mixture. The waterproofing tape produced by this method experiences no hindrance by a binder and consequently exhibits an exceptionally high speed of water absorption. It nevertheless suffers ready exfoliation of the cross-linked polymer particles from the substrate.

For the purpose of preventing the separation of the cross-linked polymer particles from the substrate, it is desirable to use an organic polymer type binder. The amount of the organic polymer type binder to be used is in the range of from 5 to 300 parts by weight, preferably from 10 to 80 parts by weight, based on 100 parts by weight of the cross-linked polymer. If the amount of the organic polymer type binder to be used exceeds 300 parts by weight, the produced waterproofing tape possibly suffers an unduly low speed of water absorption and poor waterproofing ability. If this amount is less than 5 parts by weight, since the adhesive force of the cross-linked polymer particles to the substrate is unduly low, the produced waterproofing tape possibly suffers exfoliation of the cross-linked polymer particles from the substrate while the waterproofing tape is exposed to the impact of handling as during the insertion thereof in a cable.

The organic polymer type binders which are effectively usable herein include synthetic rubber, natural rubber, polyacrylic esters, polyalkylene oxides, polyurethane, hydrophilic polyurethane, polyesters, polyamides, polyethylene, ethylene-vinyl acetate copolymer, polyvinyl alcohol, carboxymethyl cellulose, hydroxyethyl cellulose, polyacrylic acid, and cross-linked polyacrylic acid, for example. The hydrophilic polyurethane which is produced by the reaction of a polyalkylene oxide with isocyanate compound proves to be particularly desirable.

In the production of the waterproofing tape of the present invention, the monomer mixture may incorporate therein various additives for the purpose of improving the waterproofing ability, for example. These additives are not particularly restricted. The additives which are effectively usable herein include fibrous substances such as asbestos, pulp, synthetic fibers, and natural fibers and inorganic and organic minute particles such as silica, alumina, synthetic silicates, magnesium carbonate, magnesium silicate, magnesium hydroxide, aluminum hydroxide, calcium hydroxide, calcium carbonate, bentonite, kaolinite, zeolite, titanium dioxide, activated clay, borax, zinc borate, and carbon black, for example. Among other additives mentioned above, inorganic minute particles are particularly effective in improving the waterproofing tape in speed of water absorption and flame retardance.

The inorganic minute particles are desired to have an average diameter not exceeding 200 μm, preferably falling in the range of from 1 to 50 μm. If the average particle diameter exceeds 200 μm, the produced waterproofing tape possibly suffers unduly low waterproofing ability or unduly large wall thickness and consequently fails to enter the small gap in the cable. The addition of inorganic minute particles having an average particle diameter of less than 1 μm to the cross-linked polymer demands due attention because the cross-linked polymer particles incorporating these inorganic minute particles, when used in a cable grade waterproofing agent, suffers an undue increase in gel viscosity and an undue decrease in waterproofing ability. The amount of the inorganic minute particles to be added is in the range of from 0.05 to 100 parts by weight, preferably 1 to 50 parts by weight, based on 100 parts by weight of the cross-linked polymer particles. If the amount is less than 0.05 part by weight, the effect of the addition is not substantially manifested. If this amount exceeds 100 parts by weight, since the proportion of the cross-linked polymer particles in the waterproofing tape is proportionately small, the waterproofing tape possibly suffers a decrease in the ratio of swelling and a decrease of the waterproofing effect.

The substrate to be used in the waterproofing tape of this invention has no particular restriction. The substrates which are effectively usable herein include non-woven fabric, woven fabric, paper, and film severally made of polyolefins, polyesters, polyamides, polyacrylonitrile (acryl), polycarbonates, and cellulose, for example. Among other substrates mentioned above, the sheet of non-woven fabric using long-staple filaments of polyester or acryl produced by the span bond method proves to be particularly desirable from the standpoints of strength, waterproofing quality, and non-biodegradability.

The weight of the cross-linked polymer particles to be fixed on the substrate in the waterproofing tape of the present invention has no particular restriction. The weight on dry basis is desired to be in the range of from 5 to 300 g/m², preferably from 30 to 150 g/m². If this amount is less than 5 g/m², the produced waterproofing tape possibly produces a poor waterproofing effect. If the amount exceeds 300 g/m², the produced waterproofing tape betrays insufficient softness and possibly suffers poor workability.

The waterproofing yarns according with the present invention are produced by fixing the cross-linked polymer particles mentioned above on the surface and/or in the pores of the substrate in the form of yarns. The waterproofing yarns of this invention are obtained by fixing the cross-linked polymer particles produced as described above on the substrate. In this case, the cross-linked polymer particles may be fixed either in a dry state or in a wet state on the substrate. Various methods are available for the production of the waterproofing yarns by the fixation of the cross-linked polymer particles on the substrate. The following methods are effectively usable therefor, for example.

(1) A method which produces waterproofing yarns by preparing a mixture for fixation by the addition to the cross-linked polymer particles of an organic polymer type binder, inorganic or organic minute particles, a fibrous substance, and a solvent, either applying the mixture to either or both of the surfaces of the substrate of the form of a sheet or film of non-woven fabric, woven fabric, paper, or plastic film or impregnating the substrate with the mixture, drying the coated or impregnated substrate when the solvent has been used or heat-treating it when the thermosetting binder or heatsealing binder has been used, and further bundling the resultant composite.

The substrate of the form of a sheet or tape is desired to be given a slitting treatment or a splitting treatment before or after the treatment of coating or impregnation. The slitting or splitting treatment enables the produced waterproofing yarns to be improved in the speed of water absorption and in the initial waterproofing effect.

(2) A method which produces waterproofing yarns by coating or impregnating long-staple filaments of synthetic fibers with the aforementioned mixture for fixation, then either drying the coated or impregnated filaments when the solvent has been produced or heat-treating them when the thermosetting binder or heat-sealing binder has been used, and bundling the resultant composite.

(3) A method which produces waterproofing yarns by coating or impregnating the substrate of the form of yarns of plastic film or synthetic fibers with the aforementioned mixture for fixation and then either drying the coated or impregnated substrate when the solvent has been used or heat-treating it when the thermosetting binder or the heat-sealing binder has been used. The substrate of the form of yarns is desired to be given a slitting treatment or a splitting treatment before or after the coating or impregnating treatment. The slitting or splitting treatment enables the produced waterproofing yarns to be improved in the speed of water absorption and in the initial waterproofing effect.

In these methods, themethod of (3) is particularly desirable in that it excels in the operational efficiency and in the produced waterproofing yarns waterproofing effect.

The production of the waterproofing yarns of the present invention does not always require to use a binder. The fixation of the cross-linked polymer particles on either the substrate of the form of a sheet of non-woven fabric, woven fabric, paper, plastic film, synthetic fibers, or natural fibers or the substrate of the form of yarns of plastic film, synthetic fibers, or natural fibers can be accomplished simply by coating or impregnating the substrate with a mixture prepared by dispersing the cross-linked polymer particles in an organic solvent. The waterproofing yarns produced by this method experience no hindrance by a binder and consequently excel in the speed of water absorption and nevertheless possibly suffers easy exfoliation of the cross-linked polymer particles from the substrate.

For the purpose of preventing this exfoliation of the cross-linked polymer particles from the substrate, it is preferable to use an organic polymer type binder. The amount of the organic polymer type binder to be used is desired to be in the range of from 5 to 100 parts by weight, preferably from 10 to 50 parts by weight, based on 100 parts by weight of the cross-linked polymer. If the amount of the organic polymer type binder to be used exceeds 100 parts by weight, the waterproofing yarns possibly suffer a decrease in the speed of water absorption and a decline in the waterproofing ability. If this amount is less than 5 parts by weight, since the adhesive force of the cross-linked polymer to the substrate is not sufficient, the waterproofing yarns possibly suffer exfoliation of the cross-linked polymer particles from the substrate while the waterproofing yarns are being inserted in a cable. The organic polymer binder to be used herein may be the same as used in the waterproofing tape.

In the production of the waterproofing yarns of the present invention, the cross-linked polymer may incorporate therein a reducing agent and other various additives for the purpose of improving the waterproofing ability. The additives used herein may be the same as used in the waterproofing tape. The average particle diameter and the amount of addition of the inorganic minute particles may be the same as used in the waterproofing tape.

The substrate to be used for the waterproofing yarns of the present invention have no particular restriction. The materials effectively usable for the substrate herein include polyolefins, polyesters, polyamides, polyacrylonitrile (acryl), polycarbonates, and cellulose, for example. The forms which the substrate is allowed to assume include synthetic fibers, yarns of synthetic fibers, and yarns of plastic film, for example. Among other substrates available at all, yarns of plastic films of polyolefins, polyesters, and polyamides and long-staple filaments of synthetic fibers prove to be particularly desirable in terms of strength, waterproofing quality, and non-biodegradability.

The thickness of the substrate of the form of yarns is preferable to be in the range of from 500 to 60,000 deniers, preferably from 1,000 to 10,000 deniers. If this thickness is less than 500 deniers, the waterproofing yarns possibly suffer inferior handling as during the conversion thereof into a cable. If the thickness exceeds 60,000 deniers, the waterproofing yarns possibly encounter difficulty in filling small gaps in a cable. When the waterproofing yarns are produced by coating or impregnating the substrate of the form of synthetic fibers or film and then bundling the resultant composite, the produced waterproofing yarns are desired to have a thickness in the range of from 500 to 60,000 deniers.

The weight of the cross-linked polymer particles to be fixed on the substrate of the waterproofing yarns of this invention is desired to be in the range of from 0.05 to 30 g/m, preferably from 0.1 to 5 g/m on dry basis. If this weight is less than 0.05 g/m, the produced waterproofing yarns possibly suffer a poor waterproofing effect. Conversely, if this weight exceeds 30 g/m, the produced waterproofing yarns betray deficiency in softness and consequently possibly suffer poor workability.

The waterproofing yarns of this invention, when necessary, may be subjected to a crimping treatment. The crimping treatment serves the purpose of uniformining the diameter of the waterproofing yarns and facilitating the insertion of the waterproofing yarns in a cable.

The absorbent composition according with the present invention comprises (A) 100 parts by weight of a cross-linked copolymer obtained by polymerizing a monomer mixture comprising at least one (meth)acrylic compound selected from the group consisting of (meth)acrylic acids and (meth)acrylic salts and a (meth)acrylamide in a molar ratio of the (meth)acrylic compound to the (meth)acrylamide in the range of from 1:9 to 5:5 and (B) 0.5 to 50 parts by weight preferably 1 to 30 parts by weight of a cross-linked poly(meth)acrylic acid (or salt thereof) obtained by polymerizing a (meth)acrylic monomer comprising (meth)acrylic acid and a (meth)acrylic salt in a molar ratio in the range of from 2:8 to 10:0. If the proportion of the cross-linked poly(meth)acrylic acid (or salt thereof) (B) is less than 0.5 part by weight, the produced absorbent composition betrays deficiency in capacity of absorption at high temperature or corrodes the material of an apparatus in which it is being used. Conversely, if this proportion exceeds 50 parts by weight, the capacity of absorption which the produced absorbent composition manifests at high temperatures is degraded by a polyvalent metallic ion in an aqueous solution.

The cross-linked polymer (A) to be used in the absorbent composition of this invention is identical with the cross-linked polymer which is used in the waterproofing agent described above. It is substantially insoluble in water and is enabled to manifest its waterproofing effect by being swelled with an aqueous liquid on contact therewith.

For the purpose of improving the cross-linked polymer (A) to be used in the absorbent composition of this invention in such properties as speed of water absorption, capacity of absorption of artificial seawater, and gel viscosity which are indispensable for the waterproofing operation to balanced levels, the hydrated gel polymer obtained by polymerizing the monomer mixture or the dry powder thereof is desired to be treated with a reducing agent incorporated therein. The kind and amount of the reducing agent to be used for this treatment may be the same as used in the waterproofing agent, the waterproofing tape, and the waterproofing yarns described above.

The average particle diameter of the cross-linked polymer (A) to be used in the absorbent composition of this invention is in the range of from 5 to 250 $\mu$m, preferably from 10 to 100 $\mu$m. If the average particle diameter exceeds 250 $\mu$m, the produced absorbent composition possibly fails to enter minute gaps or betrays a small speed of water absorption. If the average particle diameter is less than 5 $\mu$m, the produced absorbent composition possibly suffers a decrease in the waterproofing effect.

The (meth)acrylic salts which are usable in the monomer mixture for the synthesis of the cross-linked poly(meth)acrylate (B) include metal salts such as sodium (meth)acrylate, potassium (meth)acrylate, calcium (meth)acrylate, and magnesium (meth)acrylate, ammonium (meth)acrylate, and organic amines of (meth)acrylic acids, for example. The molar ratio of a (meth)acrylic acid to a (meth)acrylic salt is in the range of from 2:8 to 10:0, preferably from 5:5 to 10:0, and particularly preferably from 7:3 to 10:0. If the molar ratio is in the range of from 0:10 to 2:8 (not inclusive of 2:8 itself), the effect of the addition of the cross-linked poly(meth)acrylic acid (or salt thereof) is not manifested.

The monomer mixture for the synthesis of the cross-linked poly(meth)acrylic acid (or salt thereof) may incorporate therein a sulfonic acid group-containing monomer such as 2-sulfoethyl(meth)acrylate or 2-acrylamide-2-methylpropane sulfonic acid or a salt thereof; a (meth)acrylic ester such as methyl (meth)acrylate, ethyl (meth)acrylate, or hydroxyethyl (meth)acrylate; or an unsaturated monomer such as acrylonitrile in an amount which is short of impairing the waterproofing effect of the produced absorbent composition.

The average particle diameter of the cross-linked poly(meth)acrylic acid (or salt thereof) (B) to be used in the absorbent composition of this invention is not more than 250 μm, desirably not more than 20 μm, and more desirably not more than 5 μm. If the average particle diameter exceeds 250 μm, the produced absorbent composition possibly fails to enter minute gaps or fails to manifest the effect of the addition of the cross-linked poly(meth)acrylic acid (or salt thereof) to a full extent.

In the production of the cross-linked polymer (A) and the cross-linked poly(meth)acrylic acid (or salt thereof) for use in the present invention by the polymerization of the respective monomer mixtures described above, the polymerization is preferably to be carried out in the presence of a cross-linking agent. The use of the cross-linking agent facilitates the control of the cross-linking densities of the cross-linked polymer (A) and the cross-linked poly(meth)acrylic acid (or salt thereof) and, as a result, renders it easy to balance the aforementioned cross-linked products' speed of water absorption, capacity of absorption of artificial seawater, and gel viscosity.

The time for the addition of the cross-linking agent is not particularly restricted. The cross-linking agent may be added, for example, when the monomer mixture of a (meth)acrylic acid and/or a (meth)acrylic salt and a (meth)acrylamide is to be polymerized. Otherwise, the cross-linking agent may be added to the substantially water-soluble polymer resulting from the polymerization of the monomer mixture and the polymer containing the thus added cross-linking agent may be then subjected to the treatment as by application of heat.

The kind and amount of the cross-linking agent to be used in the production of the cross-linked polymer (A) and the cross-linked poly(meth)acrylic acid (or salt thereof) for use in the present invention may be the same as in the production of the waterproofing agent described above. It is provided, however, that the amount of the cross-linking agent to be used in the synthesis of the cross-linked poly(meth)acrylic acid (or salt thereof) is in the range of from 0.0001 to 0.10 mol, preferably from 0.0001 to 0.01 mol, per mol of the monomer mixture.

The produced polymer is desired to be heat-treated at a temperature in the range of from 150° to 250° C. when a polyhydric alcohol is used or at a temperature in the range of from 50° to 250° C. when a polyepoxy compound is used as the cross-linking agent.

In the production of the cross-linked (meth)acrylic acid (or salt thereof) (B), the method of polymerization, the kind and amount of the polymerization catalyst to be used, the solvent to be used, and the polymerization conditions may be the same as in the production of the cross-linked polymer as the waterproofing agent described above.

In the production of the cross-linked poly(meth)acrylic acid (or salt thereof) (B) by the polymerization of the monomer mixture to be performed by the method described above, the monomer mixture is preferable to incorporate therein a foaming agent or an inorganic substance in advance of the polymerization. The additive is effective in improving the produced absorbent composition in the initial waterproofing ability.

After the cross-linked polymer (A) and the cross-linked poly(meth)acrylic acid (or salt thereof) for use in the present invention are synthesized by the method of polymerization described above, they may be separated by filtration, dried, and finely pulverized into particles of a desired shape. When they are to be dried after the polymerization, the drying temperature is preferable to be in the range of from 50° to 180° C.

As the cross-linked poly(meth)acrylic acid (or salt thereof) to be used for the present invention, partially neutralized cross-linked polyacrylic acid (produced by Nippon Shokubai Co., Ltd. and marketed under trademark designation of "Aqualic CA") and cross-linked polyacrylic acids (produced by BF Goodrich Co. and marketed under trademark designation of "Carbopole", produced by Wako Pure Chemical Industries Ltd. and marketed under trademark designation of "Hybis-Wako", and produced by Nippon Junyaku K. K. and marketed under trademark designation of "Junron") prove to be particularly preferable.

Such waterproofing materials as waterproofing tape and waterproofing yarns are obtained by fixing the absorbent composition produced as described above on a substrate. Various methods are available for the production of these waterproofing materials by the fixation of the absorbent composition on the substrate. The following methods may be adopted, for example.

(1) A method which produces a waterproofing material by preparing a mixture for fixation by adding to the absorbent composition an organic polymer type binder, inorganic or organic minute particles, a fibrous substance, a surfactant, and a solvent, either applying the mixture to either or both of the surfaces of the substrate of the form of a sheet or a tape or yarns of non-woven fabric, woven-fabric, paper, or film or impregnating the substrate with the mixture, and then drying the coated or impregnated substrate when a solvent has been used or heat-treating it when a thermosetting binder or a heat-sealing binder has been used.

(2) A method which produces a waterproofing material by interposing the mixture for fixation described above between at least two opposed sheets or tapes of non-woven fabric, woven fabric, paper, or film and then drying the resultant composite when a solvent has been used or heat-treating it when a thermosetting binder or a heat-sealing binder has been used.

(3) A method which produces a waterproofing material of the form of a sheet or tape by kneading the material for a substrate such as rubber or plastic with the absorbent composition and them molding the resultant mixture with a roll or an extruding device. The produced waterproofing material may be vulcanized when the rubber has been used as the material for the substrate.

The production of the waterproofing material of the present invention does not always require to use a binder. The fixation of the cross-linked polymer particles on the substrate of the form of a sheet, a tape, or yarns of non-woven fabric, woven fabric, paper, film, synthetic fibers, or natural fibers is accomplished by simply preparing a mixture having the absorbent composition dispersed in an organic solvent and impregnating the substrate with the mixture. In this case, the cross-linked poly(meth)acrylic acid (or salt thereof) (B) additionally functions as a binder.

For the purpose of preventing the otherwise possible exfoliation of the absorbent composition from the substrate, an organic polymer type binder may be used. The kind of the organic polymer type binder to be used in this case and the amount thereof to be used may be the same as in the production of the waterproofing agent formed of the cross-linked polymer described above.

In the production of the waterproofing material of the present invention, the mixture for fixation may incorporate therein various additives for the purpose of improving the produced waterproofing material in the waterproofing ability. The kind and amount of these additives may be the same as in the production of the waterproofing agent formed of the cross-linked polymer described above. Inorganic particles are particularly effective in improving the waterproofing materials in the flame-retardance. The average particle diameter and the amount of addition of the inorganic particles may be the same as in the production of the waterproofing tape or waterproofing yarns from the cross-linked polymer described above.

The substrate to be used for the waterproofing materials such as waterproofing tape and waterproofing yarns of the present invention has no particular restriction. The substrates which are effectively usable herein include non-woven fabrics, woven fabrics, papers, films, and yarns severally made of polyolefins, polyesters, polyamides, polyacrylonitrile (acryl), polycarbonates, and cellulose, for example. Among other substrates mentioned above, non-woven fabric sheets of long-staple filaments of polyesters and acryl produced by the spun bond method prove to be particularly desirable from the standpoints of strength, waterproofing quality, and non-biodegradability.

The weight of the absorbent composition to be fixed on the substrate in the waterproofing material of this invention has no particular restriction. In the case of the waterproofing tape, the weight is desired to be in the range of from 5 to 300 g/m$^2$, preferably from 30 to 150 g/m$^2$, on dry basis. If the amount of the absorbent composition to be deposited is less than 5 g/m$^2$, the produced waterproofing tape possibly produces an insufficient waterproofing effect. If this amount exceeds 300 g/m$^2$, the produced waterproofing tape acquires insufficient softness and consequently possibly betrays poor workability. In the case of the waterproofing yarns, the weight is preferable to be in the range of from 0.05 to 30 g/m, preferably from 0.1 to 5 g/m, on dry basis. If the amount of the absorbent composition to be deposited is less than 0.05 g/m, the produced waterproofing yarns possibly manifest an insufficient waterproofing effect. If this amount exceeds 30 g/m, the produced waterproofing yarns are deficient in softness and, as a result, possibly betray poor workability.

Now, the present invention will be described more specifically below with reference to working examples. The scope of the present invention is not limited to these working examples.

The physical properties such as, for example, capacity of water absorption, speed of water absorption, gel viscosity, and waterproofing ability, of the produced waterproofing agent, cross-linked polymer particles and absorbent composition were determined by the following methods.

Method for Determination of Capacity of Water Absorption

The capacity of water absorption was determined by uniformly placing 0.2 g of a sample comprising waterproofing agent, cross-linked polymer particles or absorbent composition (in case of waterproofing agent, classified to 48 mesh pass and 100 mesh on) in a teabag-like pouch of non-woven fabric (40 mm × 150 mm), keeping the filled pouch immersed in artificial seawater, removing the impregnated pouch from the artificial seawater after one hour's immersion, allowing the wet pouch to drain for a fixed length of time, weighing the pouch, and performing calculation of the following formula.

Capacity of water absorption (g/g) = [Weight of sample after absorption (g) − Blank (g)]/[Weight of sample (g)]

The term "blank" refers to the weight of the teabag-like pouch subjected in an empty state to the same procedure. The artificial seawater contained 1.38 g of $CaSO_4$, 2.10 g of $MgSO_4$, 3.32 g of $MgCl_2$, 0.72 g of KCl, and 26.69 g of NaCl each per kg.

Method for Determination of Speed of Water Absorption

Figure 1:
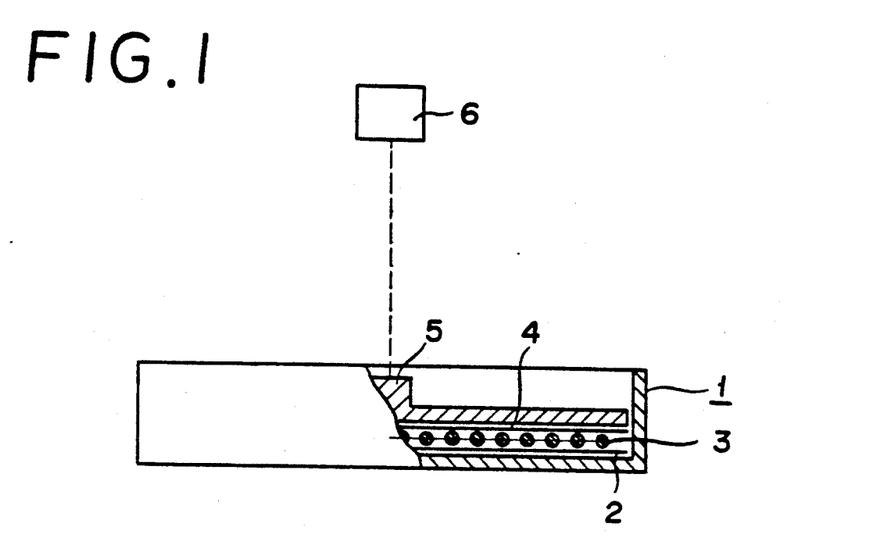
FIG. 1 is an explanatory diagram illustrating an apparatus for determination of the speed of water absorption, partially cut away to show the interior thereof.

FIG. 1 is a diagram showing an apparatus for the determination of speed of water absorption, partially cut away to show the interior. As illustrated in FIG. 1, on the bottom of a cylindrical container 1 measuring 40 mm in depth and 50.2 cm$^2$ in bottom surface area, a non-woven fabric 2 was laid, 0.5 g of a sample comprising waterproofing agent, cross-linked polymer particles or an absorbent composition 3 (in case of waterproofing agent, classified to 48 mesh pass and 100 mesh on) was uniformly scattered thereon, and a non-woven fabric 4 was superposed thereon. A perforated lid 5 weighing 91.6 g was placed thereon, a distance sensor 6 was installed thereon, and 50 g of seawater (of the same composition as indicated in the preceding paragraph "method for determination of capacity of water absorption") was added to the container 1. The time required for the distance to which the perforated lid 5 was pushed up when the sample 3 was swelled with seawater to reach the maximum was clocked. The time required for the height to reach 90% of the maximum was reported as the speed of water absorption.

Method for Determination of Gel Viscosity

An absorbent gel was prepared by adding 35 g of an aqueous 3.5% NaCl solution to 2.5 g of a given waterproofing agent, cross-linked polymer particles or an absorbent composition (in case of waterproofing agent, classified 48 mesh pass and 100 mesh on). This absorbent gel was placed in a container measuring 6 cm in depth and 9 cm$^2$ in bottom surface area and tested for gel viscosity by the use of an instrument (produced by Iio Denki K. K. and marketed under trademark designation of "Neo-card Meter"). The term "gel viscosity" as used herein means the apparent viscosity generated in the form of friction force due to the flow of the gel.

Method for Determination of Waterproofing Ability

Figure 2:
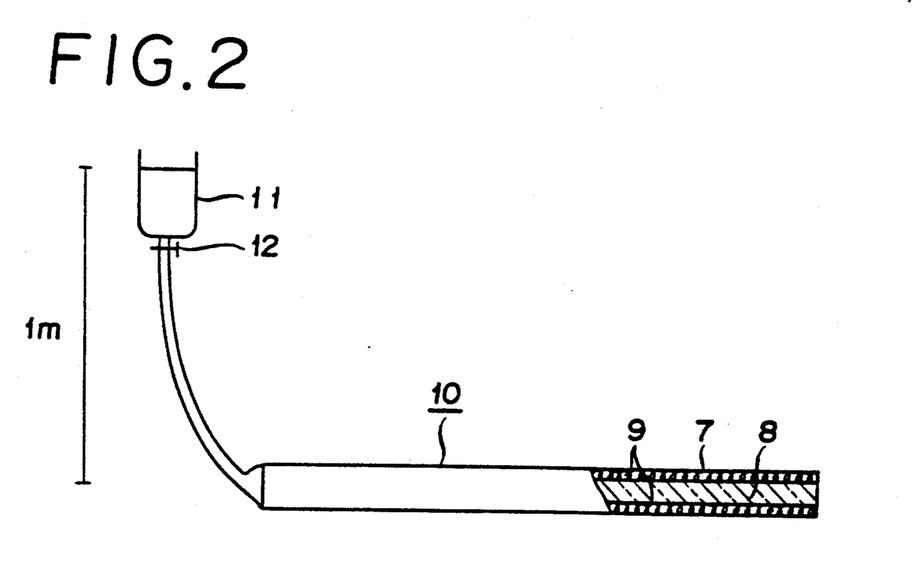
FIG. 2 is an explanatory diagram illustrating an apparatus for determination of the waterproofing ability, partially cut away to show the interior thereof.

FIG. 2 is a diagram illustrating an apparatus for the determination of waterproofing ability, partially cutaway to show the interior. As shown in FIG. 2, in a glass tube 7 measuring 15 mm in inside diameter and 2,000 mm in length, a glass rod 8 measuring 11 mm in diameter and 2,000 mm in length was inserted and fixed in such a manner that an annular gap of 2 mm separated the surface of the glass rod 8 from the inner wall of the glass tube 7. A simulated cable 10 was produced by filling the annular gap with a mixture 9 of containing 18 g of a waterproofing agent and 18 g of pulp obtained by nipping the waterproofing agent between sheets of pulp. In the case of a waterproofing tape, a simulated cable was produced by wrapping a glass rod measuring 13.5 mm in outside diameter and 2,000 mm in length with one ply of the waterproofing tape and inserting the covered glass rod in the same glass tube as used above in such a manner as to give rise to a uniform annular gap. In the case of waterproofing yarns, a simulated cable was produced by inserting one cord of waterproofing yarns in a glass tube measuring 2 mm in inside diameter and 2,000 mm in length.

The simulated cable 10 was placed horizontally. A container 11 filled with artificial seawater (of the same composition as indicated in the preceding paragraph "method for determination of capacity of water absorption") was connected to one end of the simulated cable 10 and placed so that the liquid level therein rose to at a height of 1,000 mm above the simulated cable. Then, a cock 12 in the low part of the container 11 was opened to allow the artificial seawater to flow into the simulated cable. The infiltration of the artificial seawater into the simulated cable was kept under observation. The waterproofing ability of the waterproofing material in the simulated cable was evaluated by measuring the distance to which the artificial seawater traveled from the end of the simulated cable over a period of one hour. In the case of the waterproofing tape and the waterproofing yarns, the waterproofing ability was evaluated after 14 days following the start of the infiltration of the artificial seawater in the simulated cable.

Method for Determination of Heat Resistance

The heatresistance of an absorbent composition or cross-linked polymer (A) was determined by keeping a sample heated at 160° C. for four days, measuring the loss of the capacity of absorption due to the heating, and performing calculation of the following formula.

Loss of capacity of absorption (%)={[(Initial capacity of absorption)−(Capacity of absorption after heating)]/[Initial capacity of absorption]}×100

Method for Determination of pH

The pH of a sample was determined by dissolving 0.5 g of sodium chloride in 200 ml of deionized water, dispersing 0.5 g of a given absorbent composition or cross-linked polymer (A), and measuring the pH value of the resultant dispersion with the aid of a pH meter.

EXAMPLE 1

In a cylindrical separable flask having an inner volume of 500 ml, 31.3 g (0.33 mol) of sodium acrylate, 55.2 g (0.78 mol) of acrylamide, 0.12 g (0.0008 mol) of N,N-methylene-bis-acrylamide, and 164.9 g of water were homogenized.

The flask, with the air entrapped therein displaced preparatorily with nitrogen, was heated on a hot water bath to 25° C. The homogenous solution in the heated flask was combined with 1.94 g of an aqueous 20% sodium persulfate solution and 1.94 g of an aqueous 2% L-ascorbic acid solution and left standing at rest to induce polymerization of the monomer mixture. After the polymerization was initiated, the solution began to generate heat and heated to 90° C. in 40 minutes. After the elevation of the solution temperature ceased, the bath temperature was raised to 90° C. and then kept at this level for 40 minutes to age the produced polymer. The polymer consequently obtained was finely pulverized, then dried at 160° C. for three hours with hot air, and comminuted to afford a waterproofing agent (1). The waterproofing agent (1) was tested for physical properties by the methods described above. The results are shown in Table 1.

EXAMPLE 2

A waterproofing agent was obtained by repeating the procedure of Example 1, except that the produced polymer was finely divided, combined with 2.1 g of an aqueous 35% sodium hydrogen sulfite solution, and dried at 160° C. for three hours with hot air. This waterproofing agent was designated as waterproofing agent (2). The waterproofing agent (2) was tested for physical properties by the methods described above. The results are shown in Table 1.

EXAMPLE 3

A waterproofing agent was obtained by repeating the procedure of Example 1, except that the produced polymer was finely divided, combined with 1 g of an aqueous 35% L-ascorbic acid solution, and dried at 160° C. for three hours with hot air. The waterproofing agent was designated as waterproofing agent (3). The waterproofing agent (3) was tested for physical properties by the methods described above. The results are shown in Table 1.

CONTROL 1

A waterproofing agent was obtained by repeating the procedure of Example 1, except that 104.41 g (1.11 mols) of sodium acrylate, 0.12 g (0.0008 mol) of N,N-methylene-bis-acrylamide, and 303.3 g of water were used in the place of 31.3 g (0.33 mol) of sodium acrylate, 55.2 g (0.78 mol) of acrylamide, 0.12 g (0.0008 mol) of N,N-methylene-bis-acrylamide, and 164.9 g of water. This waterproofing agent was designated as waterproofing agent (1) for comparison. The waterproofing agent (1) for comparison was tested for physical properties by the methods described above. The results are shown in Table 1.

CONTROL 2

A waterproofing agent was obtained by repeating the procedure of Example 1, except that the produced polymer was finely divided, dried at 160° C. for three hours, and comminuted and the product of comminution was mixed with an anhydrous silica powder (produced by Nippon Aerosil K. K. and marketed under trademark designation of "AEROSIL-200") in a ratio of 5 g of the anhydrous silica powder to 100 g of the product of comminution. The waterproofing agent thus obtained was designated as waterproofing agent (2) for comparison. Waterproofing agent (2) for comparison was tested for physical properties by the methods described above. The results are shown in Table 1.

CONTROL 3

A waterproofing agent was obtained by repeating the procedure of Example 1, except that the amount of N,N-methylene bis-acrylamide to be used was changed to 0.003 g (0.00002 mol). The waterproofing agent thus obtained was designated as waterproofing agent (3) for comparison. The waterproofing agent (3) for comparison was tested for physical properties by the methods described above. The results are shown in Table 1.

CONTROL 4

A waterproofing agent was obtained by repeating the procedure of Example 1, except that the amount of N,N-methylene bis-acrylamide to be used was changed to 15 g (0.1 mol). The waterproofing agent thus obtained was designated as waterproofing agent (4) for comparison. The waterproofing agent (4) for comparison was tested for physical properties by the methods described above. The results are shown in Table 1.

CONTROL 5

A waterproofing agent was obtained by repeating the procedure of Example 1, except that 5.6 g (0.06 mol) of sodium acrylate, 74.6 g (1.05 mols) of acrylamide, 0.12 g (0.0008 mol) of N,N-methylene-bis-acrylamide, and 151.9 g of water were used in the place of 31.3 g (0.33 mol) of sodium acrylate, 55.2 g (0.78 mol) of acrylamide, 0.12 g (0.0008 mol) of N,N-methylene-bis-acrylamide, and 164.9 g of water. The waterproofing agent thus obtained was designated as waterproofing agent (5) for comparison. This waterproofing agent (5) for comparison was tested for physical properties by the methods described above. The results are shown in Table 1.

CONTROL 6

A waterproofing agent was obtained by repeating the procedure of Example 1, except that 73.3 g (0.78 mol) of sodium acrylate, 23.4 g (0.33 mol) of acrylamide, 0.12 g (0.0008 mol) of N,N-methylene-bis-acrylamide, and 183.9 g of water were used in the place of 31.3 g (0.33 mol) of sodium acrylate, 55.2 g (0.78 mol) of acrylamide, 0.12 g (0.0008 mol) of N,N-methylene-bis-acrylamide, and 164.9 g of water. The waterproofing agent thus obtained was designated as waterproofing agent (6) for comparison. This waterproofing agent (6) for comparison was tested for physical properties by the methods described above. The results are shown in Table 1.

TABLE 1

| Waterproofing agent | Capacity of absorption of artificial seawater (g/g) | Speed of absorption (min) | Gel viscosity (dyne · s/cm$^3$) | Waterproofing ability after 1 hr (cm) |
| --- | --- | --- | --- | --- |
| Waterproofing agent (1) | 21 | 2.2 | 1.5 × 10$^5$ | 18 |
| Waterproofing agent (2) | 23 | 2.5 | 1.2 × 10$^5$ | 12 |
| Waterproofing agent (3) | 23 | 2.6 | 1.1 × 10$^5$ | 23 |
| Waterproofing agent for composition (1) | 4 | 2.0 | 1.4 × 10$^5$ | 54 |
| Waterproofing agent for composition (2) | 21 | 2.1 | 4.8 × 10$^5$ | 38 |
| Waterproofing agent for composition (3) | 25 | 6.5 | 0.5 × 10$^5$ | 67 |
| Waterproofing agent for composition (4) | 3 | 1.2 | 3.1 × 10$^5$ | 53 |
| Waterproofing agent for composition (5) | 19 | 12.0 | 1.1 × 10$^5$ | 49 |
| Waterproofing agent for composition (6) | 7 | 3.2 | 1.3 × 10$^5$ | 45 |

EXAMPLE 4

In a cylindrical separable flask having an inner volume of 500 ml, 31.3 g (0.33 mol) of sodium acrylate, 55.2 g (0.78 mol) of acrylamide, 0.20 g (0.0013 mol) of N,N-methylene-bis-acrylamide, and 165 g of water were homogenized. The flask, with the air entrapped therein displaced preparatorily with nitrogen, was heated on a hot water bath to 25° C. The homogeneous solution in the heated flask was combined with 1.94 g of an aqueous 20% sodium persulfate and 1.94 g of an aqueous 2% L-ascorbic acid solution and then left standing at rest to induce polymerization of the monomer mixture. The produced polymer was finely pulverized, dried at 160° C. for three hours, and comminuted to obtain cross-linked polymer particles (1) having an average particle diameter of 45 μm. The cross-linked polymer particles (1) were tested for physical properties by the method described above. The results are shown in Table 2.

EXAMPLE 5

Cross-linked polymer particles (2) having an average particle diameter of 46 μm were obtained by finely dividing the polymer obtained in Example 4, combining the resultant powder with 2.1 g of an aqueous 35% sodium hydrogen sulfite solution, drying the resultant mixture at 160° C. for three hours, and comminuting the dried mixture. The cross-linked polymer particles (2) were tested for physical properties by the methods described above. The results are shown in Table 2.

EXAMPLE 6

Cross-linked polymer particles (3) having an average particle diameter of 15 μm were obtained by repeating the procedure of Example 4, except that 31.3 g (0.33 mol) of sodium acrylate, 10.3 g (0.11 mol) of acrylic acid, 47.3 g (0.67 mol) of acrylamide, 0.31 g (0.0020 mol) of N,N-methylene-bis-acrylamide, and 165 g of water were used in the place of 31.3 g of sodium acrylate, 55.2 g of acrylamide, 0.20 g of N,N-methylene-bis-acrylamide, and 165 g of water. The cross-linked polymer particles (3) were tested for physical properties by the methods described above. The results are shown in Table 2.

CONTROL 7

Cross-linked polymer particles (1) for comparison having an average particle diameter of 46 μm were obtained by repeating the procedure of Example 4, except that 104.4 g (1.11 mols) of sodium acrylate, 0.20 g (0.0013 mol) of N,N-methylene-bis-acrylamide, and 303 g of water were used in the place of 31.3 g of sodium acrylate, 55.2 g of acrylamide, 0.20 g of N,N-methylene-bis-acrylamide, and 165 g of water. The cross-linked polymer particles (1) for comparison were tested for physical properties by the methods described above. The results are shown in Table 2.

CONTROL 8

A polymer was obtained by repeating the procedure of Example 4, except that 31.3 g (0.33 mol) of sodium acrylate, 55.2 g (0.78 mol) of acrylamide, 0.077 g (0.0005 mol) of N,N-methylene-bis-acrylamide, and 165 g of water were used in the place of 31.3 g of sodium acrylate, 55.2 g of acrylamide, 0.20 g of N,N-methylene-bis-acrylamide, and 165 g of water. The polymer was finely divided, combined with 8.9 g of an aqueous 35% sodium hydrogen sulfite solution, dried at 160° C. for three hours, and comminuted to afford cross-linked polymer particles (2) for comparison having an average particle diameter of 44 $\mu$m. The cross-linked polymer particles (2) for comparison were tested for physical properties by the methods described above. The results are shown in Table 2.

CONTROL 9

Cross-linked polymer particles (3) for comparison having an average particle diameter of 45 $\mu$m were obtained by repeating the procedure of Example 4, except that 0.002 g (0.000012 mol) of N,N-methylene-bis-acrylamide was used in the place of 0.20 g of N-N-methylene-bis-acrylamide. The cross-linked polymer particles (3) for comparison were tested for physical properties by the methods described above. The results are shown in Table 2.

CONTROL 10

Cross-linked polymer particles (4) for comparison having an average particle diameter of 45 $\mu$m were obtained by repeating the procedure of Example 4, except that 15 g (0.1 mol) of N,N-methylene-bis-acrylamide was used in the place of 0.20 g of N,N-methylene-bis-acrylamide. The cross-linked polymer particles (4) for comparison were tested for physical properties by the methods described above. The results are shown in Table 2.

CONTROL 11

Cross-linked polymer particles (5) for comparison having an average particle diameter of 47 $\mu$m were obtained by repeating the procedure of Example 4, except that 5.6 g (0.06 mol) of sodium acrylate, 74.6 g (1.05 mols) of acrylamide, 0.20 g (0.0013 mol) of N,N-methylene-bis-acrylamide, and 151 g of water were used in the place of 31.3 g of sodium acrylate, 55.2 g of acrylamide, 0.20 g of N,N-methylene-bis-acrylamide, and 165 g of water. The cross-linked polymer particles (5) for comparison were tested for physical properties by the methods described above. The results are shown in Table 2.

CONTROL 12

Cross-linked polymer particles (6) for comparison having an average particle diameter of 43 $\mu$m were obtained by repeating the procedure of Example 4, except that 73.3 g (0.78 mol) of sodium acrylate, 23.4 g (0.33 mol) of acrylamide, 0.20 g (0.0013 mol) of N,N-methylene-bis-acrylamide, and 183 g of water were used in the place of 31.3 g of sodium acrylate, 55.2 g of acrylamide, 0.20 g of N,N-methylene bis-acrylamide, and 165 g of water. The cross-linked polymer particles (6) for comparison were tested for physical properties by the methods described above. The results are shown in Table 2.

TABLE 2

| Cross-linked polymer particles | Average particle diameter ($\mu$m) | Capacity of absorption of artificial seawater (g/g) | Speed of absorption (min) | Gel viscosity ($\times 10^5$ dyne · s/cm$^3$) |
| --- | --- | --- | --- | --- |
| Cross-linked polymer particles (1) | 45 | 20 | 2.1 | 1.3 |
| Cross-linked polymer particles (2) | 46 | 22 | 2.3 | 1.1 |
| Cross-linked polymer particles (3) | 15 | 22 | 2.0 | 0.9 |
| Cross-linked polymer particles for comparison (1) | 46 | 4 | 1.3 | 1.3 |
| Cross-linked polymer particles for comparison (2) | 44 | 25 | 5.2 | 0.4 |
| Cross-linked polymer particles for comparison (3) | 45 | 26 | 6.8 | 0.3 |
| Cross-linked polymer particles for comparison (4) | 45 | 5 | 1.3 | 2.9 |
| Cross-linked polymer particles for comparison (5) | 47 | 18 | 11.2 | 1.1 |
| Cross-linked polymer particles for comparison (6) | 43 | 7 | 3.1 | 1.4 |

EXAMPLES 7 TO 9 AND CONTROLS 13 to 18

A hydrophilic polyurethane was obtained by dissolving 30 parts by weight of polyethylene oxide having an average molecular weight of 800,000 and 0.05 part by weight of triethylene diamine in 470 parts by weight of acetonitrile, combining the resultant solution with 0.1 part by weight of 2,4-trylene diisocyanate, and heating the mixture under a current of nitrogen at 70° C. for 5 hours thereby inducing reaction of the components. Compositions for fixation were prepared by adding the cross-linked polymer particles (1) to (3) obtained in Examples 4 to 6 and the cross-linked polymer particles (1) to (6) for comparison obtained in Controls 1 to 6 severally in a fixed amount of 100 parts by weight to the hydrophilic polyurethane.

The compositions for fixation were applied each to the opposite surfaces of a spun bond non-woven sheet of long-staple polyester fibers (produced by Asahi Chemical Industry Co., Ltd. and marketed under trademark designation of "Eltas E5030") and the applied layers of the compositions were dried, to obtain waterproofing tapes (1) to (3) of this invention and waterproofing tapes (1) to (6) for comparison. The thickness of the waterproofing tapes was about 140 $\mu$m and the amount of cross-linked polymer particles deposited was about 70 g/m$^2$. Waterproofing ability of the waterproofing tape thus obtained was determined by the above mentioned method. the results are shown in Table 3.

TABLE 3

|  | Cross-linked polymer particles used | Waterproofing ability (mm) | |
|---|---|---|---|
|  |  | after 1 hr | after 14 days |
| Example 7 | Cross-linked polymer particles (1) | 565 | 623 |
| Example 8 | Cross-linked polymer particles (2) | 495 | 524 |
| Example 9 | Cross-linked polymer particles (3) | 773 | 841 |
| Control 13 | Cross-linked polymer particles for composition (1) | >2000 | >2000 |
| Control 14 | Cross-linked polymer particles for composition (2) | 1460 | >2000 |
| Control 15 | Cross-linked polymer particles for composition (3) | 1560 | >2000 |
| Control 16 | Cross-linked polymer particles for composition (4) | >2000 | >2000 |
| Control 17 | Cross-linked polymer particles for composition (5) | >2000 | >2000 |
| Control 18 | Cross-linked polymer particles for composition (6) | 1850 | >2000 |

EXAMPLES 10 TO 12 AND CONTROLS 19 to 24

A polyacrylic ester having an average molecular weight of 60,000 was obtained by polymerizing a monomer mixture comprising 35% by weight of methyl methacrylate, 40% by weight of butyl acrylate, 15% by weight of acrylic acid, and 10% by weight of hydroxyethyl methacrylate. Compositions for fixation were prepared by mixing 20 parts by weight of the polyacrylic ester with 100 parts by weight severally of the cross-linked polymer particles (1) to (3) obtained in Examples 4 to 6 and the cross-linked polymer particles (1) to (6) for comparison obtained in Controls 7 to 12, 50 parts by weight of white carbon as inorganic minute particles, 0.5 part by weight of nonylphenol ethoxylate (produced by Asahi Denka Kogyo K. K. and marketed under trademark designation of "Adeka-tol NP-650"), and 40 parts by weight of isopropyl alcohol.

Waterproofing tapes (4) to (6) of the present invention and waterproofing tapes (7) to (12) for comparison were obtained by applying the compositions for fixation to the opposite surfaces of a polyester film having a thickness of 50 μm and drying the applied layers of the composition. The thickness of the produced tapes was about 140 μm and the amount of cross-linked polymer particles deposited was about 60 g/m². The waterproofing tapes were tested for waterproofing ability by the method described above. The results are shown in Table 4.

CONTROL 25

In a cylindrical separable flask having an inner volume of 500 ml, 31.3 g (0.33 mol) of sodium acrylate, 10.3 g (0.11 mol) of acrylic acid, 47.3 g (0.67 mol) of acrylamide, 350 g of water were homogenized. The flask, with the air entrapped therein displaced preparatorily with nitrogen, was heated on a hot water bath to 25° C. The solution in the hot flask was combined with 4 g of an aqueous 20% sodium persulfate solution and 4 g of an aqueous 2% L-ascorbic acid solution and left standing at rest to induce polymerization of the monomer mixture. The resultant polymer was combined with 400 g of water and 0.90 g (0.0052 mol) of ethylene glycol diglycidyl ether to obtain an aqueous solution for fixation.

A spun bond non-woven fabric sheet of long-staple polyester fibers (produced by Asahi Chemical Industry Co., Ltd. and marketed under trademark designation of "Eltas E5030") was impregnated with the aqueous solution for fixation, removed from the solution, and dried by heating at 120° C. A sheet having the cross-linked polymer deposited thereon was obtained by repeating the cycle of impregnation and drying by heating. The thickness of this sheet was 50 μm. The amount of the cross-linked polymer deposited by the heating of the aqueous solution was 20 g/m². A waterproofing tape (13) for comparison was obtained by superposing three such sheets. The waterproofing tape (13) for comparison was tested for waterproofing ability by the method described above. The results are shown in Table 4.

TABLE 4

|  | Cross-linked polymer particles used | Waterproofing ability (mm) | |
|---|---|---|---|
|  |  | after 1 hr | after 14 days |
| Example 10 | Cross-linked polymer particles (1) | 652 | 698 |
| Example 11 | Cross-linked polymer particles (2) | 543 | 572 |
| Example 12 | Cross-linked polymer particles (3) | 843 | 882 |
| Control 19 | Cross-linked polymer particles for composition (1) | >2000 | >2000 |
| Control 20 | Cross-linked polymer particles for composition (2) | 1562 | >2000 |
| Control 21 | Cross-linked polymer particles for composition (3) | 1762 | >2000 |
| Control 22 | Cross-linked polymer particles for composition (4) | >2000 | >2000 |
| Control 23 | Cross-linked polymer particles for composition (5) | >2000 | >2000 |
| Control 24 | Cross-linked polymer particles for composition (6) | >2000 | >2000 |
| Control 25 |  | >2000 | >2000 |

EXAMPLES 13 TO 15 AND CONTROLS 26 TO 31

A hydrophilic polyurethane was obtained by dissolving 30 parts by weight of polyethylene oxide having an average molecular weight of 800,000 and 0.05 part by weight of triethylene diamine in 470 parts by weight of acetonitrile, adding 0.1 part by weight of 2,4-trylene diisocyanate, and heating the resultant mixture in a current of nitrogen at 70° C. for 5 hours thereby effecting reaction of the components. Compositions for fixation were prepared by adding 200 parts by weight severally of the cross-linked polymer particles (1) to (3) obtained in Examples 4 to 6 and the cross-linked polymer particles (1) to (6) for comparison obtained in Controls 1 to 6 to the hydrophilic polyurethane.

Waterproofing yarns (1) to (3) of the present invention and waterproofing yarns (1) to (6) for comparison were obtained by impregnating split yarns of polypropylene 4,000 deniers in thickness (produced by Ishimoto Maraon K. K. and marketed under trademark designation of "Mylit N") and drying the wet split yarns. The amount of cross-linked polymer particles deposited in the split yarns in the waterproofing yarns was 0.9 g/m. The waterproofing yarns thus obtained were tested for waterproofing ability by the method described above. The results are shown in Table 5.

TABLE 5

|  | Cross-linked polymer particles used | Waterproofing ability (mm) | |
|---|---|---|---|
|  |  | after 1 hr | after 14 days |
| Example 13 | Cross-linked polymer particles (1) | 580 | 650 |
| Example 14 | Cross-linked polymer particles (2) | 470 | 520 |
| Example 15 | Cross-linked polymer particles (3) | 660 | 720 |
| Control 26 | Cross-linked polymer particles | >2000 | >2000 |

TABLE 5-continued

| | Cross-linked polymer particles used | Waterproofing ability (mm) | |
|---|---|---|---|
| | | after 1 hr | after 14 days |
| Control 27 | Cross-linked polymer particles for composition (1) | 1270 | >2000 |
| Control 28 | Cross-linked polymer particles for composition (2) | 1350 | >2000 |
| Control 29 | Cross-linked polymer particles for composition (3) | >2000 | >2000 |
| Control 30 | Cross-linked polymer particles for composition (4) | 1650 | >2000 |
| Control 31 | Cross-linked polymer particles for composition (5) | >2000 | >2000 |
| | Cross-linked polymer particles for composition (6) | | |

EXAMPLES 16 TO 18 AND CONTROLS 32 TO 37

A polyacrylic ester having an average molecular weight of 60,000 was obtained by polymerizing a monomer mixture comprising 35% by weight of methyl methacrylate, 40% by weight of butyl acrylate, 15% by weight of acrylic acid, and 10% by weight of hydroxyethyl methacrylate. Compositions for fixation were prepared by mixing 10 parts by weight of the polyacrylic ester with 100 parts by weight severally of the cross-linked polymer particles (1) to (3) obtained in Examples 4 to 6 and the cross-linked polymer particles (1) to (6) for comparison obtained in Controls 7 to 12, 30 parts by weight of white carbon as inorganic minute particles, 0.5 part by weight of nonylphenol ethoxylate (produced by Asahi Denka Kogyo K. K. and marketed under trademark designation of "Adeka-tol NP-650") as a surfactant, and 40 parts by weight of isopropyl alcohol.

Waterproofing yarns (4) to (6) of the present invention and waterproofing yarns (7) to (12) for comparison were obtained by impregnating split yarns of polypropylene 4,000 deniers in thickness [produced by Ishimoto Maraon K. K. and marketed under trademark designation of "Mylit N"] with the compositions for fixation mentioned above and drying the wet split yarns. The amount of cross-linked polymer particles deposited on the waterproofing yarns was 0.8 g/m. These waterproofing yarns were tested for waterproofing ability by the method described above. The results are shown in Table 6.

CONTROL 38

In a cylindrical separable flask having an inner volume of 500 ml, 31.3 g (0.33 mol) of sodium acrylate, 10.3 g (0.11 mol) of acrylic acid, 47.3 g (0.67 mol) of acrylamide, and 350 g of water were homogenized. The flask, with the air entrapped therein preparatorily with nitrogen, was heated on a hot water bath to 25° C. The solution in the hot flask was combined with 4 g of an aqueous 20% sodium persulfate and 4 g of an aqueous 2% L-ascorbic acid solution, and left standing at rest to induce polymerization of the monomer mixture. An aqueous solution for fixation was obtained by combining the resultant polymer with 400 g of water and 0.90 g (0.0052 mol) of ethylene glycol diglycidyl ether.

Waterproofing yarns were obtained by impregnating split yarns of polypropylene 400 deniers in thickness (produced by Ishimoto Maraon and marketed under trademark designation of "Mylit N") with the aqueous solution for fixation, removing the impregnated split yarns, and drying them by heating at a temperature of 120° C. Waterproofing yarns (13) for comparison having the cross-linked polymer deposited thereon were obtained by repeating the cycle of impregnation and drying by heating. The amount of the cross-linked polymer particles deposited in consequence of the drying by heating the aqueous solution for fixation was 0.9 g/m. The waterproofing yarns (13) for comparison were tested for waterproofing ability by the method described above. The results are shown in Table 6.

TABLE 6

| | Cross-linked polymer particles used | Waterproofing ability (mm) | |
|---|---|---|---|
| | | after 1 hr | after 14 days |
| Example 16 | Cross-linked polymer particles (1) | 640 | 720 |
| Example 17 | Cross-linked polymer particles (2) | 440 | 470 |
| Example 18 | Cross-linked polymer particles (3) | 530 | 590 |
| Control 32 | Cross-linked polymer particles for composition (1) | >2000 | >2000 |
| Control 33 | Cross-linked polymer particles for composition (2) | 1540 | >2000 |
| Control 34 | Cross-linked polymer particles for composition (3) | 1770 | >2000 |
| Control 35 | Cross-linked polymer particles for composition (4) | >2000 | >2000 |
| Control 36 | Cross-linked polymer particles for composition (5) | 1830 | >2000 |
| Control 37 | Cross-linked polymer particles for composition (6) | >2000 | >2000 |
| Control 38 | | >2000 | >2000 |

EXAMPLE 19

In a cylindrical separable flask having an inner volume of 500 ml, 31.3 g (0.33 mol) of sodium acrylate, 55.2 g (0.78 mol) of acrylamide, 0.20 g (0.0013 mol) of N,N-methylene-bis-acrylamide, and 165 g of water were homogenized. The flask, with the air entrapped therein displaced preparatorily with nitrogen, was heated on a hot water bath to 25° C. The solution in the hot flask was combined with 1.94 g of an aqueous 20% sodium persulfate solution and 1.94 g of an aqueous 2% L-ascorbic acid solution, and left standing at rest to induce polymerization of the monomer mixture. Cross-linked polymer particles (4) having an average particle diameter of 46 μm were obtained by finely dividing the resultant polymer, combining the resultant powder with 2.1 g of an aqueous 35% sodium hydrogen sulfite solution, drying the resultant mixture at 160° C. for three hours, and comminuting the dried mixture. The cross-linked polymer particles (4) were tested for physical properties by the methods described above. The results are shown in Table 7.

EXAMPLE 20

An absorbent composition (1) of the present invention was obtained by adding 2 parts by weight of cross-linked polyacrylic acid (produced by Wako Pure Chemical Industries Ltd. and marketed under trademark designation of "Hybis-Wako 104") to 100 parts by weight of the cross-linked polymer particles (4) obtained in Example 19. The absorbent composition (1) was tested for physical properties by the methods described above. The results are shown in Table 7.

EXAMPLE 21

Cross-linked polymer particles (5) having an average particle diameter of 43 μm were obtained by repeating the procedure of Example 19, except that 23.5 g (0.25 mol) of sodium acrylate, 5.76 g (0.08 mol) of acrylic acid, 55.2 g (0.78 mol) of acrylamide, 0.23 g (0.0015 mol) of N,N-methylene bis-acrylamide, and 165 g of water were used in the place of 31.3 g of sodium acrylate, 55.2 g of acrylamide, 0.20 g of N,N-methylene-bis-acrylamide, and 165 g of water. The cross-linked polymer particles (5) were tested for physical properties by the methods described above. The results are shown in Table 7.

EXAMPLE 22

An absorbent composition (2) of the present invention was obtained by adding 20 parts by weight of a cross-linked polymer of acrylic acid-sodium acrylate (acrylic acid: sodium acrylate ratio 80:20; average particle diameter 15 μm) to 100 parts by weight of the cross-linked polymer particles (4) obtained in Example 19. The absorbent composition (2) was tested for physical properties by the methods described above. The results are shown in Table 7.

EXAMPLES 23 AND 24

A polyacrylic ester having an average molecular weight of 60,000 was obtained by polymerizing a monomer mixture consisting of 35% by weight of methyl methacrylate, 40% by weight of butyl acrylate, 15% by weight of acrylic acid, and 10% by weight of hydroxyethyl methacrylate. Compositions for fixation were prepared by mixing 20 parts by weight of the polyacrylic ester with 100 parts by weight severally of the absorbent compositions (1) and (2) obtained in Examples 20 and 22, 50 parts by weight of white carbon as inorganic minute particles, 0.5 part by weight of nonylphenol ethoxylate (produced by Asahi Denka Kogyo K. K. and marketed under trademark designation of "Adeka-tol NP-650") as a surfactant, and 40 parts by weight of isopropyl alcohol.

Waterproofing tapes (7) and (8), i.e. waterproofing materials of the present invention, were obtained by applying the compositions for fixation to the opposite surfaces of a polyester film 50 μm in thickness and drying the applied layers of the compositions. The thickness of the waterproofing tapes was about 140 μm. The amount of the absorbent composition deposited was about 60 g/m². The waterproofing tapes were tested for waterproofing ability by the method described above. The results are shown in Table 8.

TABLE 8-continued

| | | | |
|---|---|---|---|
| Example 23 | Absorbent composition (1) | 532 | 612 |
| Example 24 | Absorbent composition (2) | 684 | 845 |

What is claimed is:

1. A cable grade waterproofing agent made of a cross-linked polymer produced by polymerizing a monomer mixture comprising at least one (meth)acrylic compound selected from the group consisting of (meth)acrylic acids and (meth)acrylic salts with a (meth)acrylamide in a molecular ratio of said (meth)acrylic compound to said (meth)acrylamide in the range from 1:9 to 5:5 in an aqueous state, said monomer concentration being in the range of 30 to 80% by weight, in the presence of a polymerization initiator in a range of 0.01 to 1% by weight, based on the amount of said monomer and a cross-linking agent in a range of 0.0005 to 0.005 mol, per mol of said monomer mixture, at a temperature of 20° to 100° C., drying the resultant polymer at a temperature of 100° to 170° C., said cross-linked polymer exhibiting a speed of absorption of not more than 8 minutes as expressed by the time required for the absorption of artificial seawater to reach 90% of the maximum, a capacity for absorption of said artificial seawater of not less than 8 times its own weight, and a gel viscosity in the range of from $0.6 \times 10^5$ to $2.5 \times 10^5$ dyne·s/cm³, the artificial seawater containing 1.38 g of $CaSO_4$, 2.10 g of $MgSO_4$, 3.32 g of $MgCl_2$, 0.72 g of KCl, and 26.69 g of NaCl each per kg.

2. A waterproofing agent according to claim 1, wherein said (meth)acrylic acid and said (meth)acrylic acid salt are present in a molar ratio in the range of 5:5 to 0:10.

3. A waterproofing agent according to claim 1, wherein the molar ratio of said (meth)acryl compound to said (meth)acrylamide is in the range of from 2:8 to 4:6.

4. A waterproofing agent according to claim 1, wherein said capacity for absorption of said artificial seawater is in the range of from 12 to 50 times the own weight.

5. A waterproofing agent according to claim 1, wherein said gel viscosity is in the range of from $1.0 \times 10^5$ to $1.8 \times 10^5$ dyne·s/cm³.

6. A waterproofing agent according to claim 1, wherein said cross-linked polymer has been treated with a reducing agent.

TABLE 7

| | Absorbent composition or Cross-linked polymer particles | Average particle diameter (μm) | Capacity of absorption of artificial seawater (g/g) | Speed of absorption (min) | Gel viscosity ($\times 10^5$ dyne·s/cm³) | Heat resistance (ratio of decrease of absorption ability) (%) | pH |
|---|---|---|---|---|---|---|---|
| Example 19 | Cross-linked polymer particles (4) | 46 | 22 | 2.3 | 1.1 | 9 | 8.6 |
| Example 20 | Absorbent composition (1) | 44 | 20 | 2.6 | 1.2 | 11 | 7.2 |
| Example 21 | Cross-linked polymer particles (5) | 43 | 22 | 2.4 | 1.9 | 25 | 7.1 |
| Example 22 | Absorbent composition (2) | 38 | 18 | 1.9 | 1.4 | 9 | 7.0 |

TABLE 8

| | Waterproofing ability (mm) | |
|---|---|---|
| Absorbent composition used | after 1 hr | after 14 days |

7. A waterproofing agent according to claim 6, wherein the amount of said reducing agent to be added is in the range of from 0.0001 to 0.02 mol per mol of the total amount of monomers.

8. A waterproofing agent according to claim 1, wherein said cross-linked polymer has an average particle diameter in the range of from 5 to 500 μm.

* * * * *